United States Patent [19]

Dane

[11] 4,029,060

[45] June 14, 1977

[54] OSCILLATING VANE ENGINE

[76] Inventor: Dan H. Dane, 416 Wake Forest Drive, Wake Village, Tex. 75501

[22] Filed: May 21, 1976

[21] Appl. No.: 688,851

[52] U.S. Cl. .......................... 123/18 R; 123/192 R
[51] Int. Cl.² ........................................ F02B 53/00
[58] Field of Search .................... 91/223, 339, 340; 123/18 R, 18 A, 192 R, 192 B; 417/481–484

[56] References Cited

UNITED STATES PATENTS

| 1,802,650 | 4/1931 | Helmlinger | 123/18 R |
| 2,053,017 | 9/1936 | Babel | 123/18 R X |

FOREIGN PATENTS OR APPLICATIONS

| 2,250,896 | 4/1974 | Germany | 123/18 R |
| 2,254,223 | 5/1974 | Germany | 123/18 R |

Primary Examiner—Carlton R. Croyle
Assistant Examiner—Michael Koczo, Jr.
Attorney, Agent, or Firm—L. D. Wofford, Jr.; George J. Porter; John R. Manning

[57] ABSTRACT

A vane-type internal combustion engine in which, during a power stroke, a spring is compressed which delivers back power to the engine during a non-powered stroke and provides relatively even torque.

5 Claims, 7 Drawing Figures

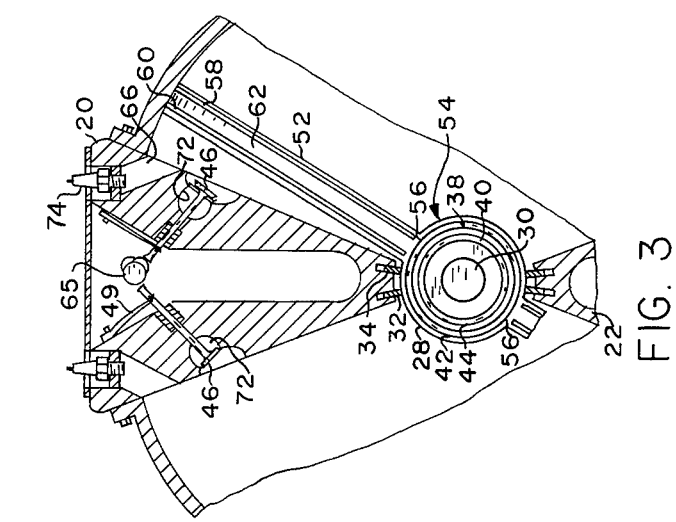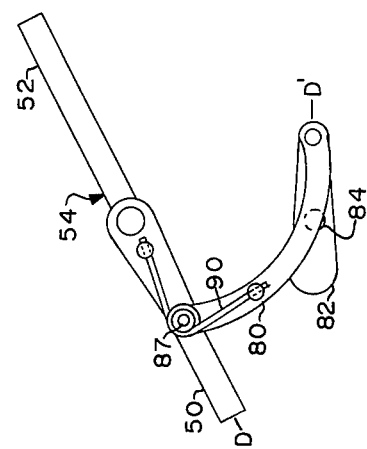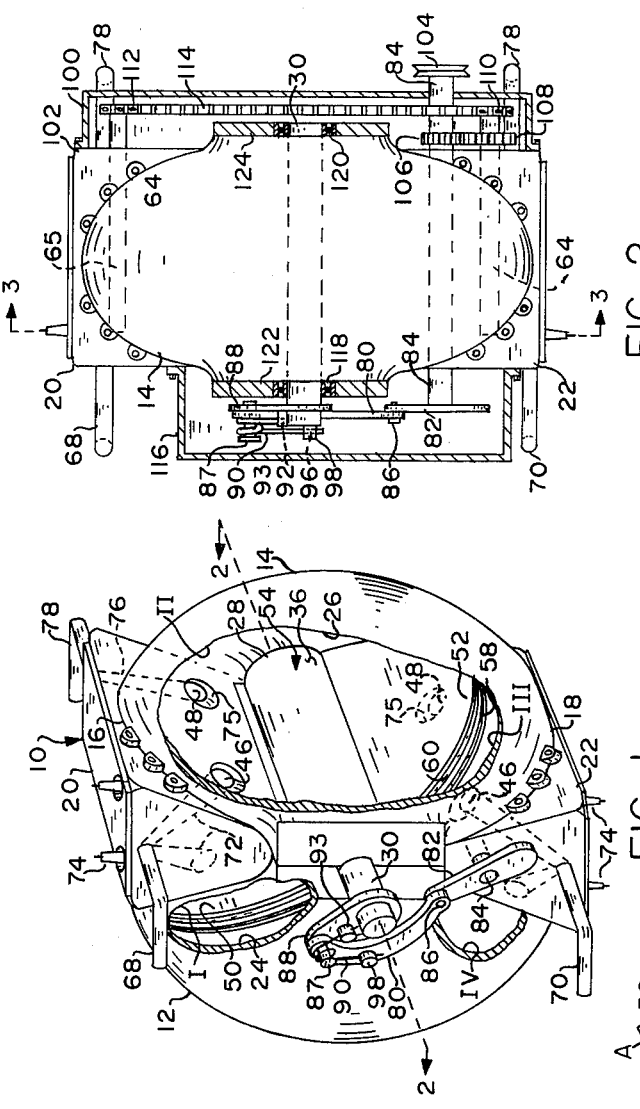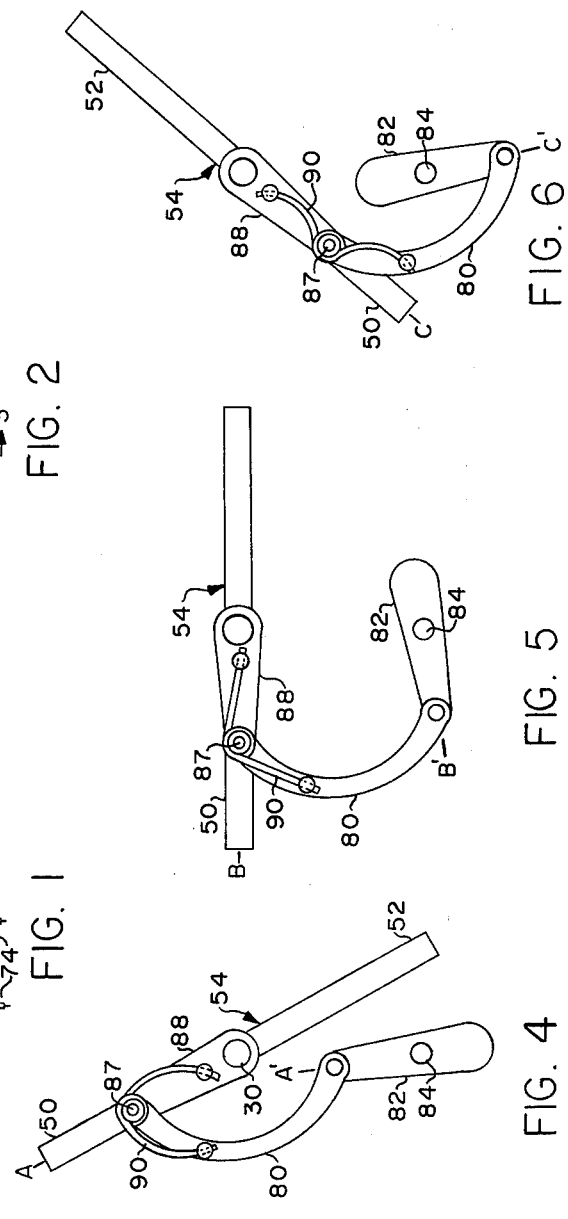

OSCILLATING VANE ENGINE

ORIGIN OF THE INVENTION

The invention described herein was made by an employee of the United States Government and may be manufactured and used by or for the Government of the United States of American for governmental purposes without the payment of any royalties thereon or therefor.

BACKGROUND OF THE INVENTION

1. Field of the Invention

This invention relates to internal combustion engines, and particularly to oscillating vane-type engines.

2. General Description of the Prior Art

Oscillating vane-type engines have heretofore been disclosed and are generally disclosed in S. Ficsur et al U.S. Pat. No. 3,299,867 and Davis U.S. Pat. No. 3,408,991. This type engine offers certain advantages over pure rotary engines in that, for example, the compression and expansion chambers are more clearly defined and the engine functions can thus be better controlled. On the other hand, known types of oscillating vane-type engines still produce pulse-type power because of the reciprocating motion of the vanes, and thus torque is unevenly produced, resulting in less-than-smooth engine performance.

SUMMARY OF THE INVENTION

In accordance with the present invention, a vane-type engine is constructed in which the oscillating movement of a vane-type piston is coupled to, and rotates, a drive shaft through linkage consisting of a crank on a vane-type piston shaft and on the drive shaft. A pivoted arm connects the ends of the shafts. This arm, or link, is spring biased by a double-acting spring, the spring being unstressed when the vane or vanes are positioned intermediate opposite ends of a stroke, whereby when the spring is stressed, it supplies torque, this occurring during dead-center conditions.

BRIEF DESCRIPTION OF THE DRAWINGS

FIG. 1 is a perspective view, partially broken away, of an embodiment of the invention.

FIG. 2 is a partial section view taken along lines 2—2 of FIG. 1.

FIG. 3 is a partial section view taken along lines 3—3 of FIG. 2.

FIGS. 4–7 are side views of the spring enhanced vane operation of the engine during one rotation of the engine.

DETAILED DESCRIPTION OF THE DRAWINGS

Referring to the drawings, and initially to FIG. 1, there is illustrated a four stroke-cycle embodiment of the invention. Basic engine block assembly 10 includes semi-toroidal members 12 and 14, which are sealably joined at ends 16 and 18 by oppositely positioned headers 20 and 22. The interior of the engine housing is divided into two gas-tight compartments 24 and 26 by cylindrical member 28, which is centrally supported for rotation on shaft 30. An essentially gas-tight seal is formed between the two compartmments by elongated bar-type seals 32 and 34 (FIG. 3) which are supported within the inner end regions of headers 20 and 22, and which are urged into sealing contact with the outer periphery 36 of cylindrical member 28 by leaf-type, or coil, springs (not shown). A gas-tight seal is formed around the ends of cylindrical member 28 by circular seals 38 and 40, which are supported within grooves 42 and 44 formed in the ends of cylindrical member 28 (FIG. 3). Each of the compartments 24 and 26 is further divided into two separate compartments, or firing chambers, being designated firing chambers I, II, III, and IV, each having its own spark plug and set of conventionally operating intake and exhaust valves 46 and 48, which are normally closed by valve springs 49. The firing chambers are formed by elliptical vanes 50 and 52 of vane assembly 54, each vane extending in the same plane from diametrically opposed regions 56 (FIG. 3) of cylindrical member 28, with vane 50 oscillating from end to end in compartment 26. This clockwise and counterclockwise rotation of the vanes is over a travel of approximately 125°. The vanes oscillate in a sealed relationship with respect to the interior of compartments 24 and 26 by virtue of elliptical rings 58 and 60, supported about edge 62 of vanes 50 and 52.

Fuel from a conventional carburetion system is supplied to the engine through fuel inlets 68 and 70 mounted in headers 20 and 22, and is fed through interior ducts 72 to each of intake valves 46. Exhaust is likewise conventionally achieved, being by means of an exhaust valve 48 coupled to each of the firing chambers. Exhaust gases are discharged through ports 75 and through integral ducts 76, which direct the exhaust gases from the engine to exhaust conduit 78 of each of the headers 20 and 22. A spark plug 74 is connected through a precombustion duct 66 to each of the firing chambers. Spark plugs are energized by a conventional ignition system which is conventionally timed by a connection (not shown) to drive shaft 30, or, optionally, to one of cam shafts 64 or 65, which operate the valves. As a four-stroke cycle engine, the firing sequence of the firing chambers of the engine is in the order of I, II, III, and IV, as the chamber are labelled in FIG. 1.

Valve timing drive gear 106 is mounted on drive shaft 84 near side 102 of header 22. Timing drive gear 106 drives timing gear 108, and thereby lower cam operating shaft 64. The latter synchronously operates in a conventional manner an intake valve 46 and exhaust valve 48 coupled to each of the chambers III and IV. Similarly, sprocket gear 110 on shaft 64 synchronously drives through chain 114 upper sprocket 112, and thereby upper cam shaft 65, which conventionally operates upper intake valves 46 and exhaust valves 48 coupled to chambers I and IV.

As a particular feature of this invention, reciprocal energy is converted to rotary energy by link 80 connected between oscillating shaft 30 and crank 82 on output shaft 84. Link 80 is pivotally attached at one end by pivot pin 86 to crank 82, and is pivotally attached at the opposite end to a second pivot pin 87 secured to crank 88. One end of a double-acting hair pin-shaped spring 90 is inserted through opening 92 formed in pin 93, and is wound in a counterclockwise direction around the outer portion of pivot pin 87. The other end of spring 90 is secured through an opening 96 formed in pin 98 (FIG. 2). Pin 98 is secured at a point below the center of connecting link 80. Dimensionally, crank 82 is slightly shorter than crank 88, and the spacing between shafts 30 and 84 is slightly less than the effective length of link 80.

Power takeoff shaft 84 extends through lower ending header 22 and through cover 100 on side 102 of engine 10 and provides a power takeoff facility, illustrated by pulley 104.

Front and rear covers 116 and 100, shown in FIG. 2, were omitted from FIG. 1 in order to display the method of attaching housing members 12 and 14. Main shaft 30 is supported by bearings 118 and 120, which are in turn supported by rectangular bearing plates 122 and 124, attached to engine housing 10.

To examine operation of the engine, and initially referring to FIG. 4, it will be assumed that vane assembly 54 is initially at one end of its oscillating stroke, with vane 50 at a circumferential point A. In this posture, spring 90 is compressed and is moving arm 80 clockwise about pivot pin 87, and thereby pulling crank 82 counterclockwise, moving it past dead center, being moved from the shown position of A'. At the same time, which will vary depending upon a selected spark advance, the previously compressed combustion mixture in chamber I fires, forcing vane 50 counterclockwise to position B and crank 82 counterclockwise through position B', as shown in FIG. 5, wherein spring 90 is essentially unwound. As vane 50 continues its counterclockwise travel, spring 90 commences to be placed in tension, absorbing energy until at the end of travel of vane 50, a posture C shown in FIG. 6, vane 50 is at a maximum tension position, and crank 88 is at a position C' tending to move crank 82 past bottom dead center.

Next, it will be assumed that a compressed explosive charge exists in chamber II, having been compressed during the preceding stroke of vane 50. This charge is now fired with the result that vane assembly 54 reverses rotation, rotating clockwise through the position shown in FIG. 7 wherein vane assembly 54 is at a position D and crank 82 is at a position D'. When at this point, spring 90 is in a near neutral position. Vane assembly 54 continues clockwise to the return position shown in FIG. 4, during which movement spring 90 is again compressed and applies a force to move crank 82 counterclockwise off of top dead center. Thus, in one revolution of the engine, there has occurred two power strokes and two applications of spring pressure to shaft 84 to achieve an extremely even application of torque.

The second revolution of the engine is produced by the firing of chambers III and IV, in that order, and with the operation of spring 90 in an identical manner, to achieve a complete cycle of operation of the engine.

It will be noted in FIGS. 4 and 7 that the position of vane assembly 54 for a neutral state of spring 90 is not identical for opposite positions of crank 82, and there remains a slight unbalance in operation of the spring in its compression and tension modes. However, in both instances, there is adequate restoring force stored in spring 90 to perform its function in both its compression and tension modes of operation.

From the foregoing, it will be appreciated that the applicant has provided an improved oscillating vane-type engine, enabling it to provide a smooth output, approximately that obtainable from a pure rotary engine, yet at the same time maintaining the inherent advantages of discrete engine chambers as provided by a pure reciprocating engine.

The advantage of this invention is particularly applicable to small-to medium-size engines, those having displacements of 10 to 200 cubic inches per firing chamber, wherein the efficacy of spring 90 is assured.

Having thus described my invention, what is claimed is:

1. An internal combustion engine of the oscillating vane-type comprising:
   a cylindrical casing having end walls and a first shaft extending coaxially through the casing and supported for rotation by said end walls, said first shaft extending outward from at least one of said end walls for connection to a power takeoff assembly;
   a second shaft spaced parallel to said first shaft and rotatably mounted on said casing;
   a pair of vanes affixed to said second shaft within said casing, said vanes being in sealed, sliding engagement with the inside surface of said casing and end walls;
   a pair of blocking members extending inwardly from the inside surface of the casing to said second shaft and dividing the interior of said casing into two compartments, each of said vanes variably dividing a compartment into two compression chambers;
   means for cyclically applying and igniting a fuel mixture in each said compression chamber;
   exhaust means for cyclically removing products of combustion from each said chamber;
   a first crank mounted on said first shaft, and a second crank mounted on said second shaft;
   a link pivotally connecting ends of said cranks; and
   spring biasing means connected between said second crank and said link and responsive to the position of said first crank for receiving a compressive force from said first crank when said vanes approach the end of oscillating travel and to provide a rotational biasing force to said first shaft, whereby torque is provided to said first shaft directly by a said vane during movement of a said vane and from said spring biasing means to said first shaft when said vanes conclude a stroke.

2. An internal combustion engine as set forth in claim 1 wherein spacing between said first and second shafts is less than a pivot-to-pivot length of said link, and the effective length of said second crank is less than the effective length of said first crank.

3. An internal combustion engine as set forth in claim 2 wherein said spring biasing means comprises a leaf spring having an intermediate pivot, coaxial with the connection of said link to said second crank, and with ends of said spring pivotally secured between said first crank and a point on said link.

4. An internal combustion engine as set forth in claim 3 wherein said second crank is positioned in linear alignment with one of said vanes.

5. An internal combustion engine as set forth in claim 4 wherein the volume of each of said chambers is in the range of 10 to 200 cubic inches.

* * * * *